United States Patent
Tsengas

(10) Patent No.: US 10,085,422 B1
(45) Date of Patent: Oct. 2, 2018

(54) DOUBLE BALL TREAT DISPENSING PET TOY

(71) Applicant: OurPet's Company, Fairport Harbor, OH (US)

(72) Inventor: Steven Tsengas, Fairport Harbor, OH (US)

(73) Assignee: OURPET'S COMPANY, Fairport Harbor, OH (US)

( * ) Notice: Subject to any disclaimer, the term of this patent is extended or adjusted under 35 U.S.C. 154(b) by 153 days.

(21) Appl. No.: 15/164,076

(22) Filed: May 25, 2016

Related U.S. Application Data

(60) Provisional application No. 62/166,158, filed on May 26, 2015.

(51) Int. Cl.
 *A01K 15/02* (2006.01)
 *A63H 5/00* (2006.01)
 *A01K 29/00* (2006.01)

(52) U.S. Cl.
 CPC ............ *A01K 15/025* (2013.01); *A01K 29/00* (2013.01); *A63H 5/00* (2013.01)

(58) Field of Classification Search
 CPC .. A01K 15/025; A01K 15/026; A01K 5/0114; A01K 5/00; A63H 5/00
 USPC ..... 119/710, 707, 709, 711, 51.01; 446/184, 446/188, 370, 386
 See application file for complete search history.

(56) References Cited

U.S. PATENT DOCUMENTS

| | | | | |
|---|---|---|---|---|
| 5,390,629 | A * | 2/1995 | Simone | A01K 15/025 119/711 |
| 5,965,182 | A * | 10/1999 | Lindgren | A01K 15/026 119/707 |
| 6,073,581 | A * | 6/2000 | Wang | A01K 5/0114 119/51.01 |
| 6,098,571 | A * | 8/2000 | Axelrod | A01K 15/025 119/707 |
| 6,470,830 | B2 * | 10/2002 | Mann | A01K 15/026 119/709 |
| 6,484,671 | B2 * | 11/2002 | Herrenbruck | A01K 15/025 119/707 |
| 6,557,496 | B2 * | 5/2003 | Herrenbruck | A01K 15/025 119/707 |
| 6,722,317 | B2 * | 4/2004 | O'Rourke | A01K 15/025 119/51.01 |
| 7,555,997 | B2 * | 7/2009 | Wolfe, Jr. | A01K 15/025 119/707 |
| 7,833,079 | B2 * | 11/2010 | Willinger | A63H 5/00 119/707 |
| 7,866,281 | B2 * | 1/2011 | Willinger | A01K 15/025 119/710 |

(Continued)

*Primary Examiner* — Yvonne R Abbott-Lewis
(74) *Attorney, Agent, or Firm* — John D. Gugliotta

(57) ABSTRACT

A toy suitable for dispensing treats when the toy is manipulated by a user is provided. The toy includes a housing having an interior space and an exterior surface. The interior space defines a treat cavity for storing a treat to be dispensed from the toy. A plurality of differently sized or shaped exits from the housing are provided. The treat is dispensed through the exit when the toy is manipulated by the user. A sound unit is secured to the housing. The sound unit sounds a noise when the toy is manipulated by the user. The instant abstract is neither intended to define the invention disclosed in this specification nor intended to limit the scope of the invention in any way.

4 Claims, 3 Drawing Sheets

(56) References Cited

U.S. PATENT DOCUMENTS

| | | | | |
|---|---|---|---|---|
| 7,950,352 B2* | 5/2011 | Specht | ............... | A01K 15/026 119/707 |
| 8,113,150 B1* | 2/2012 | Tsengas | ............... | A01K 15/025 119/710 |
| 8,186,309 B2* | 5/2012 | Specht | ............... | A01K 15/026 119/707 |
| 8,312,844 B2* | 11/2012 | Mann | ............... | A01K 15/025 119/709 |
| 8,418,656 B2* | 4/2013 | Rutherford | ............... | A01K 15/025 119/707 |
| 8,746,182 B2* | 6/2014 | Anderson | ............... | A01K 15/025 119/709 |
| 8,997,689 B2* | 4/2015 | Ragonetti | ............... | A01K 5/00 119/51.01 |
| 2005/0045115 A1* | 3/2005 | Mann | ............... | A01K 15/026 119/711 |
| 2007/0068464 A1* | 3/2007 | Smith | ............... | A01K 15/025 119/709 |
| 2009/0038560 A1* | 2/2009 | Markham | ............... | A01K 15/026 119/709 |
| 2013/0055965 A1* | 3/2013 | Valle | ............... | A01K 15/025 119/710 |

* cited by examiner

DOUBLE BALL TREAT DISPENSING PET TOY

RELATED APPLICATIONS

The present application claims benefit of U.S. Provisional Application 62/166,158, filed on May 26, 2015.

BACKGROUND OF THE INVENTION

1. Field of the Invention

The invention relates generally to a toy for a pet, and, more particularly, to such a toy that can dispense treats or other desirable objects while generating sound when manipulated.

2. Description of the Related Art

A variety of devices exist for playing with animals and for stimulating them physically, mentally, and behaviorally. Such devices range from items such as chewable toys, plastic bones, artificial animals, and various tossing devices ranging between balls to Frisbee™ devices. In addition, artificial mice, rubber and plastic balls, rattles, bells and stuffed articles, such as balls and bags stuffed with cloth or cloth and other attractants also exist as types of conventional pet toys currently in use. Furthermore, along such review of the prior art, attention is directed to a product manufactured by Ethical Products, Inc., under the trade name "Roll-A-Treat", which is described as a treat and training ball for dogs. More specifically, treats or food are placed inside an opaque plastic ball, and an interior dispensing mechanism works like a labyrinth and the dog treat product (which must be of a shape suitable for travel within the labyrinth) falls out a single round hole.

Although cats, dogs and other pets do play with these toys by swatting, pushing and carrying them about, most pets seem to prefer a toy which acts to stimulate them into engagement or reacts to their interaction. Accordingly, efforts have recently centered on developing interactive pet toys which stimulate and/or react to the animal.

Consequently, a need exists for additional improved pet toy designs, which will automatically dispense treats of any desired shape, and which will also allow the pet and the pet owner to more easily see the contents, and which toy would be suitable for use with different animals, including dogs, cats and small mammals. In addition, a need exists for such a device wherein the outer surfaces of the device can be made of durable materials to resist animal chewing, and wherein the treat delivery mechanism is simpler and more efficient, and less prone to jamming and/or blockage of a single opening design. All told, a need exists for improved pet toys which are self-animated and which do not require regular and constant actuation by, or the presence of, the pet owner, which toys are based on an efficient and simplified self-regulating mechanical delivery system.

SUMMARY OF THE INVENTION

Therefore, it is an object of the present invention to provide an improved interactive pet toy game.

It is a feature of the present invention to provide a double ball treat dispensing toy that can dispense treats or other desirable objects while generating sound when manipulated.

Briefly described, in one aspect the invention relates to a toy suitable for dispensing treats when the toy is manipulated by a user. The toy includes a housing having an interior space and an exterior surface. The interior space defines a treat cavity for storing a treat to be dispensed from the toy. A plurality of differently sized or shaped exits from the housing are provided. The treat is dispensed through the exit when the toy is manipulated by the user. A sound unit is secured to the housing. The sound unit sounds a noise when the toy is manipulated by the user.

It is an advantage of the present invention to provide an improved pet toy design which will automatically dispense treats of any desired shape.

It is another advantage of the present invention to allow the pet and the pet owner to more easily see the contents.

It is another advantage of the present invention to provide a toy suitable for use with different animals, including dogs, cats and small mammals.

It is another advantage of the present invention to provide such a device wherein the outer surfaces of the device can be made of durable materials to resist animal chewing, and wherein the treat delivery mechanism is simpler and more efficient, and less prone to jamming and/or blockage of a single opening design.

It is yet another advantage of the present invention to provide improved pet toys which provides auditory stimulation interactive with its use.

It is still another advantage of the present invention to provide an interactive pet toy game that is attractive to both young and old pets, and that maximizes interaction with the pet.

Other objects, advantages and features will be in part apparent and in part pointed out hereinafter.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTION OF THE PREFERRED EMBODIMENT

Figure 1:
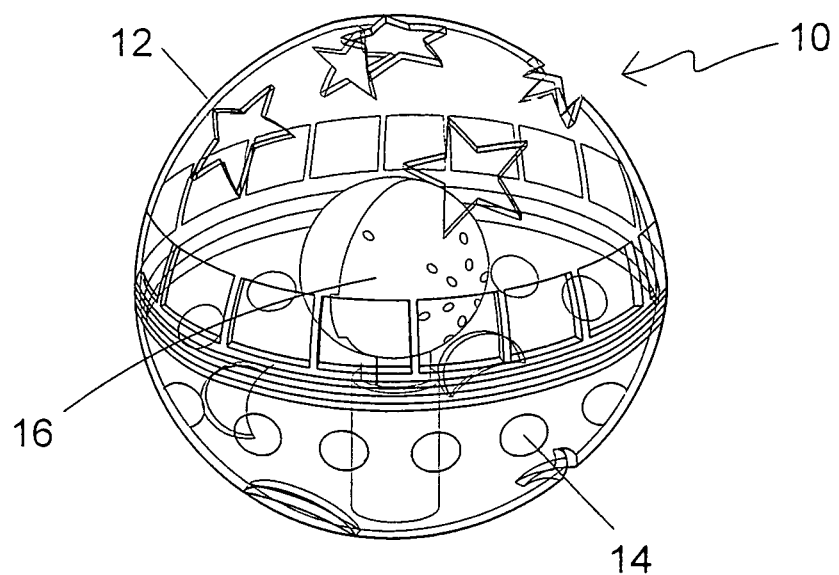
FIG. 1 is a top perspective view of a pet toy according to the preferred embodiment of the present invention.
Figure 2:
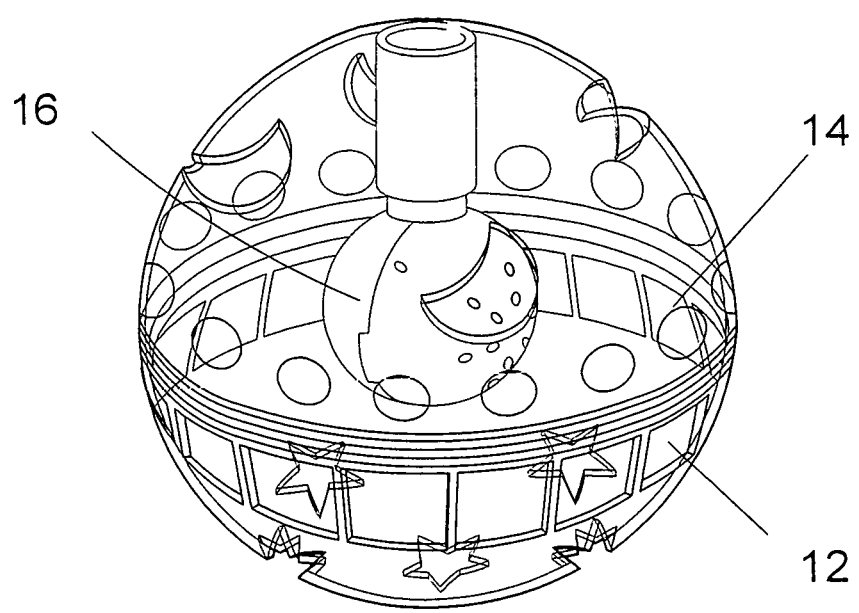
FIG. 2 is a bottom perspective view thereof.
Figure 3:
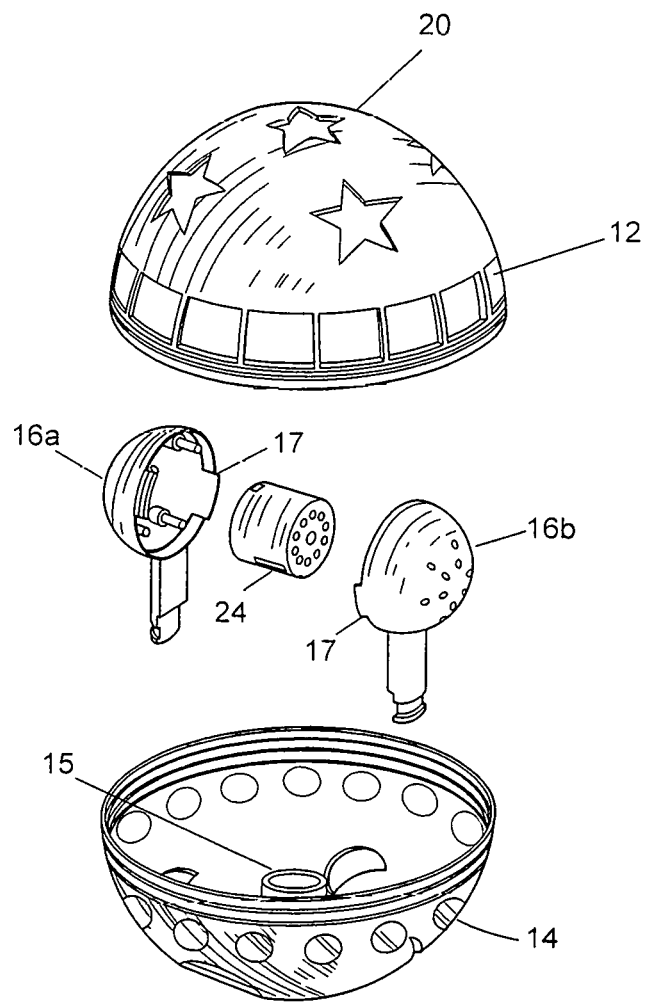
FIG. 3 is an exploded top perspective view thereof.

The best mode for carrying out the invention is presented in terms of its preferred embodiment, herein depicted within the FIGS.

1. DETAILED DESCRIPTION OF THE FIGURES

Referring now to the Figures, a pet toy, generally noted as 10, is provided according to the preferred embodiment as a double ball treat dispensing pet toy. An outer housing is formed as a round ball comprised of a hemispherical upper ball element 12 that is threadingly connected to a hemispherical lower ball element 14. Each ball element 12, 14 is respectively formed of a single molded part and further forming a plurality of access openings 16 that are formed about each respective hemispherical surface. The access openings 16 are formed of a plurality of differently sizes or shapes, and function as exits from the housing for dispensing of consumable treats (not shown). The treats are dispensed through the exits when the toy is manipulated by the user.

The lower ball element 14 forms a receiving post 15 at an inside surface. A sound module 16 is retained within the inner volume of the ball 16 by attachment to the receiving post 15.

The sound module 16 is formed of a first module half 16a and a second module half 16b that are connected together. A bayonet lock 17 may be used to snap together the module halves 16a, 16b. The sound module 16 itself is formed as an inner spherical housing having an extended post radially disposed therefrom. The spherical housing forms a secondary inner cavity in which a sound module is housed. The sound module may actuate by a momentum switch in which sound is generated upon movement of the toy 10, causing continued interaction stimulus for the pet.

The extended post of the sound module 16 is affixed to and within the receiving post 15 of the lower housing 14. Such a structure forms a double ball (ball within a ball) having an annular volume between the balls for containment of dispensed, edible treats.

2. OPERATION OF THE PREFERRED EMBODIMENT

In operation, a user activates the sound module 16 and secures the module 16 into the receiving post 15 of the lower housing 14. A consumable treat may be loaded within the housing volume, and the upper housing element 12 is threadingly engaged to the lower housing element 14 forming a treat containing ball.

Interaction with a pet will result in the motion of the ball to allow for edible treats to dispense randomly from the "holes" in the dome. Additionally, the interactively generated sound will greatly stimulate the small rodent hunting instincts of domestic felines and some canine breeds.

Additionally, other interactive stimulation is anticipated as being incorporated in conjunction with the visual stimulation provided, such as the incorporation of a sound device that preferably emits a prerecorded sound in response to movement or propulsion/retraction of the pet. This prerecorded sound can be a "permanent" prerecorded sound such as an animal's voice, such as "meow" or "purr,' a beeping sound, a human voice, laughter, such as "ha, ha, ha" or some other desired sound, or can be recorded, and re-recorded, as desired, by the user. The prerecorded sound may continue for a predetermined time period, for example five (5) seconds, and then stops or may continue as long as the sound device is sensing motion of pet. Preferably, the sound simulates a natural prey of the pet, the pre-recorded sound is a simulated sound being reflective of the sound made by the natural prey, i.e., squeak for a mouse or chirp for a bird.

The foregoing descriptions of specific embodiments of the present invention are presented for purposes of illustration and description. They are not intended to be exhaustive nor to limit the invention to precise forms disclosed and, obviously, many modifications and variations are possible in light of the above teaching. The embodiments are chosen and described in order to best explain principles of the invention and its practical application, to thereby enable others skilled in the art to best utilize the invention and its various embodiments with various modifications as are suited to the particular use contemplated. It is intended that a scope of the invention be defined broadly by the Drawings and Specification appended hereto and to their equivalents. Therefore, the scope of the invention is in no way to be limited only by the following exemplary claims nor by any possible, adverse inference under the rulings of *Warner-Jenkinson Company, v. Hilton Davis Chemical*, 520 US 17 (1997) or *Festo Corp. V. Shoketsu Kinzoku Kogyo Kabushiki Co.*, 535 U.S. 722 (2002), or other similar caselaw or subsequent precedent should not be made if such claims are amended subsequent to this Patent Application.

What is claimed is:

1. An interactive pet toy comprising:
    housing having an interior space and an exterior surface, the interior space defining a treat cavity for storing a treat to be dispensed from the housing, wherein said housing further comprises:
        a first module housing forming a portion of a containment cavity and having an extended post;
        a second module housing forming a remaining portion of the containment cavity and having an extended post, said second module housing capable of being mechanically engaged to said first module housing;
        an electronic sound producing mechanisms contained within said containment cavity; and
        said sound producing element affixed to said second housing element at said extended post;
    whereby said sound producing element is supported near a central point of said treat cavity;
    a plurality of differently sized or shaped exits formed in said housing, said exits adapted for providing egress of edible treats from said treat cavity upon manipulated by a user; and
    a sound producing element secured within the first module housing and extending into said treat cavity.

2. The pet toy of claim 1, wherein said sound producing element is capable of generating a noise upon motion of the pet toy.

3. The pet toy of claim 1, wherein said second module housing is made transparent such as to allow a user to see any contents within the treat cavity.

4. The pet toy of claim 1, wherein said first housing element and said second housing elements are threadingly engaged to connect.

* * * * *